United States Patent
Ben-Ari (12) 
(10) Patent No.: US 6,739,725 B2
(45) Date of Patent: May 25, 2004

(54) INFLATABLE THREE-DIMENSIONAL DISPLAY

(76) Inventor: Ronen Ben-Ari, 28 Hazayit Street, Ramat Hasharon (IL)

( * ) Notice: Subject to any disclaimer, the term of this patent is extended or adjusted under 35 U.S.C. 154(b) by 0 days.

(21) Appl. No.: 10/091,574

(22) Filed: Mar. 7, 2002

(65) Prior Publication Data

US 2003/0169406 A1 Sep. 11, 2003

(51) Int. Cl.⁷ .................. G03B 21/56; G03B 21/22; G03B 21/14; G03B 21/00; H04N 9/31
(52) U.S. Cl. .................. 353/28; 353/47; 353/74; 353/79; 353/119; 353/122; 359/443; 359/451; 348/744; 40/214; 446/175; 446/220; 446/226; 244/30; 244/33
(58) Field of Search .................. 353/13, 28, 46–47, 353/74, 79, 119, 122; 359/443, 451; 348/744; 352/69; 40/212, 214; 446/175, 220, 226; 244/30–31, 33, 107, 100 A, 96–97

(56) References Cited

U.S. PATENT DOCUMENTS

| | | | | |
|---|---|---|---|---|
| 2,592,444 A | * | 4/1952 | Matelena | 353/13 |
| 3,586,432 A | * | 6/1971 | Pentes, Jr. | 353/74 |
| 4,240,721 A | * | 12/1980 | Drop, Sr. | 353/74 |
| 4,323,301 A | * | 4/1982 | Spector | 359/443 |
| 4,597,633 A | * | 7/1986 | Fussell | 359/451 |
| 4,802,734 A | * | 2/1989 | Walter | 359/443 |
| 5,570,138 A | * | 10/1996 | Baron | 348/744 |
| 5,612,741 A | * | 3/1997 | Loban et al. | 348/383 |
| 5,645,248 A | * | 7/1997 | Campbell | 244/30 |
| 5,906,335 A | * | 5/1999 | Thompson | 244/96 |
| 6,148,551 A | * | 11/2000 | Glass | 40/214 |

* cited by examiner

Primary Examiner—Russell Adams
Assistant Examiner—Magda Cruz
(74) Attorney, Agent, or Firm—Mark M. Friedman (57) ABSTRACT

An inflatable display includes an inflatable balloon, a projector having a projection lens, an internal support structure that supports the inflatable balloon and the projector so that the projection lens is eccentrically disposed inside the inflatable balloon. The inflatable display also includes an external support structure that supports the internal support structure. Also included is a method to control an inflatable display according to wind conditions. The method includes the steps of operating in a sensing mode, operating in a collapsing mode and operating in a recovery mode.

24 Claims, 10 Drawing Sheets

INFLATABLE THREE-DIMENSIONAL DISPLAY

FIELD AND BACKGROUND OF THE INVENTION

The present invention relates to an inflatable three-dimensional display and, in particular, it concerns an inflatable three-dimensional display with a projector disposed eccentrically therein.

Of most relevance to the present invention is U.S. Pat. No. 2,592,444 to J. J. Matelena, wherein the invention relates to an inflatable balloon with a centrally placed projector.

A shortcoming of the aforementioned system is that the size of the display only covers a small area on each side of the balloon and therefore a majority of the balloon is not utilized for display purposes. Moreover, the three-dimensional effect that is produced by having the display cover the majority of the balloon is very attractive and enhances the display's effectiveness.

Another shortcoming of the aforementioned system is that the balloon has a weak support structure and may be damaged during windy conditions. If the balloon is used for outdoor use, its size will need to be restricted to prevent wind damage thereby reducing the overall display effect.

A further shortcoming of the aforementioned system is that the display is mainly for use at night or in darkened surroundings.

The latter shortcoming is addressed by U.S. Pat. No. 5,570,138 to Baron. Baron describes a surface for displaying a non-projected image during the daytime and a projection screen apparatus that automatically unrolls to present a projection screen for displaying a projected image during the nighttime. However, a shortcoming of Baron is that the screen is not three-dimensional. A further shortcoming of Baron is that the projector needs to be placed in front of the screen and therefore the possibilities for physical positioning of the display are limited.

Also of relevance to the present invention is U.S. Pat. No. 5,612,741 to Loban et al. and U.S. Pat. No. 4,323,301 to Spector. Loban et al. describes a video billboard with an internal projector. Spector describes a collapsible rear or front projection screen assembly. A shortcoming of both these systems is that the screens are not three-dimensional.

Also of relevance to the present invention is U.S. Pat. No. 4,802,734 to Walter. Walter describes an inflatable screen of fabric that has an envelope with a front flat surface that serves as a screen. The envelope needs to be tied to a substrate in several places in order to provide a rigid structure for the screen. The envelope also contains a number of flexible strips that extend from the floor to the roof of the envelope to help maintain the general shape of the inflatable screen. Although, this invention claims that the envelope can be a balloon shape, this embodiment is not described. Moreover, the placement of the necessary flexible strips inside a balloon will limit the placement of the projector, as the flexible strips will block the projection of the display. Also, it is difficult to tie down a balloon by several points to provide a rigid structure as described by this patent. In addition, tying the balloon to a substrate severely limits its physical placement. Moreover, the projector rests on the floor of the envelope, as the invention does not provide a support means for the projector. Therefore, the projector will rest on the floor of the balloon and will severely limit the size of the resultant display. Also, the projector will not be steady.

Moreover, all the above inventions do not address problems relating to use of the screen during windy conditions.

There is therefore a need for an inflatable three-dimensional display, which provides a large, attractive and steady display that is usable day and night, is set up easily in many locations and deals with problems caused by wind conditions.

SUMMARY OF THE INVENTION

The present invention is an inflatable three-dimensional display construction.

According to the teachings of the present invention there is provided, an inflatable display comprising: (a) an inflatable balloon; (b) a projector having a projection lens; (c) an internal support structure that supports: (i) the inflatable balloon; and (ii) the projector so that the projection lens is eccentrically disposed within the inflatable balloon; and (d) an external support structure that supports the internal support structure.

According to a further feature of the present invention the inflatable balloon has a first side and a second side and the projection lens is deployed within the first side to project onto the second side.

According to a further feature of the present invention, the inflatable balloon has a central axis and the projection lens is deployed within the inflatable balloon eccentric to the central axis.

According to a further feature of the present invention, the internal support structure can rotate in relation to the external support structure.

According to a further feature of the present invention, the external support structure is mechanically connected to the internal support structure substantially on the central axis.

According to a further feature of the present invention, the internal support structure includes: (a) a curved support member that is mechanically connected to the inflatable balloon; and (b) a support arm that is mechanically connected to both the curved support member and the projector.

According to a further feature of the present invention, the curved support member assumes the configuration of a closed loop.

According to a further feature of the present invention, the curved support member assumes the configuration of a ring.

According to a further feature of the present invention, the closed loop is configured to fold; and the internal support structure further includes a folding mechanism.

According to a further feature of the present invention, the folding mechanism includes a linear actuator.

According to a further feature of the present invention, there is also provided: (a) a wind gauge; and (b) a control circuitry that is configured to control the folding mechanism in response to an output of the wind gauge.

According to a further feature of the present invention: (a) the support arm includes a first support arm, a second support arm, a third support arm; (b) the second support arm includes a first portion and a second portion that are connected by a first hinge; and (c) the third support arm includes a third portion and a fourth portion that are connected by a second hinge.

According to a further feature of the present invention, the support arm includes a fourth support arm.

According to a further feature of the present invention: (a) the first support arm and the fourth support arm substantially lie in a first plane; and (b) the second support arm lies in a second plane and the third support arm lies in a third plane, wherein the second plane is substantially parallel to the third plane and the second plane is substantially perpendicular to the first plane.

According to a further feature of the present invention, the projector is disposed between the second plane and the third plane.

According to a further feature of the present invention, the folding mechanism includes: a first linear actuator that is mechanically connected to the first portion and the second portion; and a second linear actuator that is mechanically connected to the third portion and the fourth portion.

According to a further feature of the present invention: (a) the inflatable balloon has a first section and a second section; and (b) an attachment configuration for attaching and detaching repeatably at least one of the first section and the second section to the closed loop.

According to a further feature of the present invention, there is also provided an inflator deployed to pump air from outside of the inflatable balloon to inside the inflatable balloon.

According to a further feature of the present invention, the inflatable balloon is substantially spherical.

According to a further feature of the present invention, there is also provided a counterweight that is deployed to counter a turning moment caused by the internal support structure and the projector.

According to a further feature of the present invention, there is also provided a non-projected image and wherein the inflatable balloon has an outer surface and thereon disposed is the non-projected image.

According to a further feature of the present invention, there is also provided: (a) a light sensor; (b) a motor configured to rotate the inflatable balloon; and (c) a control system that is configured to control the motor in response to an output of the light sensor in order to turn the non-projected image towards a viewing direction by day and to turn the non-projected image away from a viewing direction by night.

According to the teachings of the present invention there is provided, a method to control an inflatable display according to wind conditions, the inflatable display comprising an inflatable balloon and a projector disposed inside the balloon, the method comprising the steps of: (a) operating in a sensing mode by: (i) sensing for a preset maximum wind speed; and (ii) maintaining inflation of the inflatable display; (b) operating in a collapsing mode by: (i) reducing inflation of the inflatable display; and (ii) collapsing an internal support structure that is mechanically connected to the inflatable display; and (c) operating in a recovery mode by: (i) reestablishing the internal support structure; and (ii) increasing inflation of the inflatable display.

According to a further feature of the present invention, the step of collapsing is performed by collapsing an internal support structure that is mechanically connected to the inflatable display by activating at least one linear actuator that is mechanically connected to the internal support structure.

According to a further feature of the present invention, there is also provided, prior to the step of reestablishing, the step of sensing for a wind speed below a second preset maximum.

According to a further feature of the present invention, there is also provided, prior to the step of reestablishing, remotely transmitting a signal to initiate the recovery mode.

According to a further feature of the present invention, the inflatable display is substantially spherical.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an inflatable three-dimensional display construction.

The principles and operation of the inflatable three-dimensional display according to the present invention may be better understood with reference to the drawings and the accompanying description.

By way of introduction, there are many problems involved in providing a three-dimensional display. Firstly, the size of a displayed image needs to cover a large part of the surface of the available screen. This can be achieved by placing the projector eccentrically in the display. However, placing the projector eccentrically creates additional problems. For example, where the display is a balloon or sphere, the display will be unbalanced due to the weight of the projector not being at the center of gravity of the display. Secondly, an internal support structure must be strong enough to support the display and the projector. However, the internal support structure must be designed so as not to block the projection of the displayed images and at the same time to secure the projector eccentrically in the display.

Thirdly, the internal support structure must be able to collapse and thereby fold and support the display during windy conditions and during transportation of the display. Fourthly, the internal and external support structure of the display should enable the display to rotate on an axis.

Figure 1:
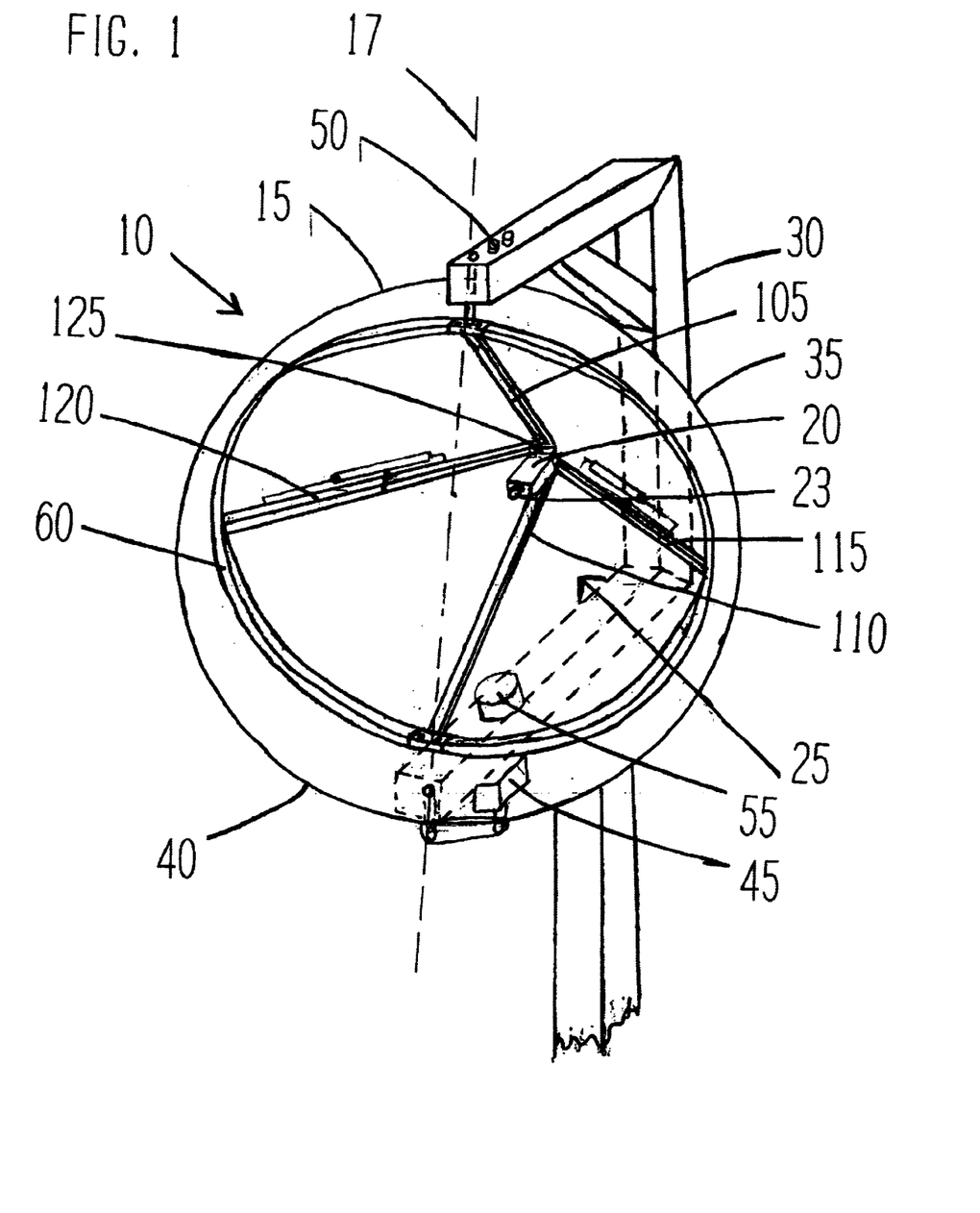
FIG. 1 is an isometric view of an inflatable three-dimensional display that is constructed and operable in accordance with a preferred embodiment of the invention.

Reference is now made to FIG. 1, which is an isometric view of an inflatable three-dimensional display 10 that is constructed and operable in accordance with a preferred embodiment of the invention. Inflatable three-dimensional display 10 includes an inflatable balloon 15 that has a central axis 17, a projector 20 having a projection lens 23, an internal support structure 25 and an external support structure 30. Internal support structure 25 supports inflatable balloon 15 and projector 20 so that projection lens 23 is eccentrically disposed inside inflatable balloon 15 in relation to central axis 17. External support structure 30 supports internal support structure 25.

Inflatable balloon 15 is formed from two sides 35 and 40. In the most preferred embodiment of the invention inflatable balloon 15 is substantially spherical and sides 35 and 40 are substantially equal. A non-projected image (not shown), for example an advertisement, is disposed on the outer surface of side 35. Side 35 is made of a material that is suitable to dispose a non-projected image thereon, using rear projection techniques. The non-projected image can be changed periodically as needed. Side 40 is made of material that is suitable to have a projected image thereon. Projector 20 is disposed so that projection lens 23 is internal to side 35 to enable the projected image to appear on side 40 and to cover the majority of side 40. Inflatable balloon 15 includes a control system that is configured to control a motor 45 in response to the output of a light sensor 50, so that side 35, with the non-projected image, faces a viewing direction by day and side 40, with the projected image, faces the viewing direction by night. It should be noted that whenever inflatable balloon 15 is required to rotate, as described above, inflatable balloon 15 typically rotates by a maximum of 360-degrees in one direction. When inflatable balloon 15 needs to rotate to another position, it rotates in the opposite direction by a maximum of 360-degrees. This is to ensure that the electrical and communication cables that feed into inflatable balloon 15 do not become over-twisted and thereby break. If it is necessary for inflatable balloon 15 to rotate more than 360-degrees a mechanism (not shown) is installed to enable inflatable balloon 15 to rotate more than 360-degrees without the risk of breaking electrical and communication cables. Inflatable balloon 15 is also configured to rotate continually about central axis 17 in one direction by approximately 15-degrees and then in the other direction by approximately 15-degrees, during the day, to attract the attention of viewing public. An inflator 55, that is typically electric, is disposed within inflatable balloon 15. Inflator 55 helps maintain the shape of inflatable balloon 15 by pumping air from outside of inflatable balloon 15 to inside inflatable balloon 15.

Any type of projector is suitable for use with inflatable three-dimensional display 10. Projector 20 is typically a video projector or a slide projector. The images produced by projector 20 are typically controlled by a computer connected to a mobile phone or other wireless device, so that the images displayed can be updated remotely. Other manual methods can be deployed such as using videotapes that are periodically changed manually. The lens (not shown) of projector 20 is typically configured as a wide-angle lens to reduce distortion of the projected image at the curved edges of side 40. Remote focusing of the lens of projector 20 can be configured if needed.

Internal support structure 25 is configured to support projector 20 and to provide support for inflatable balloon 15. Internal support structure 25 is also configured to fold when needed using a folding mechanism that is driven by linear actuators. The majority of internal support structure 25 is disposed within inflatable balloon 15.

Figure 2:
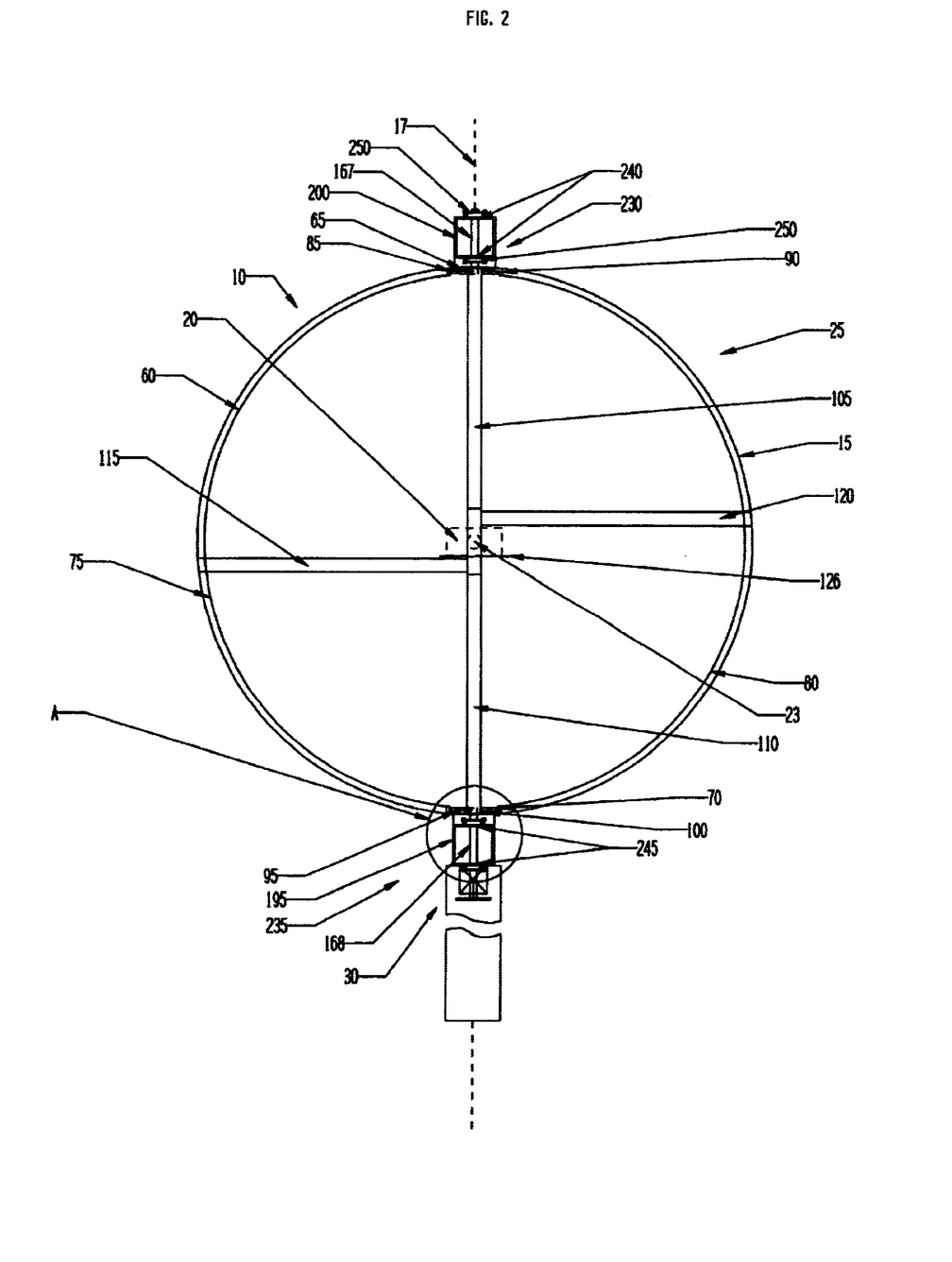
FIG. 2 is a front view of the inflatable three-dimensional display of FIG. 1.
Figure 3:
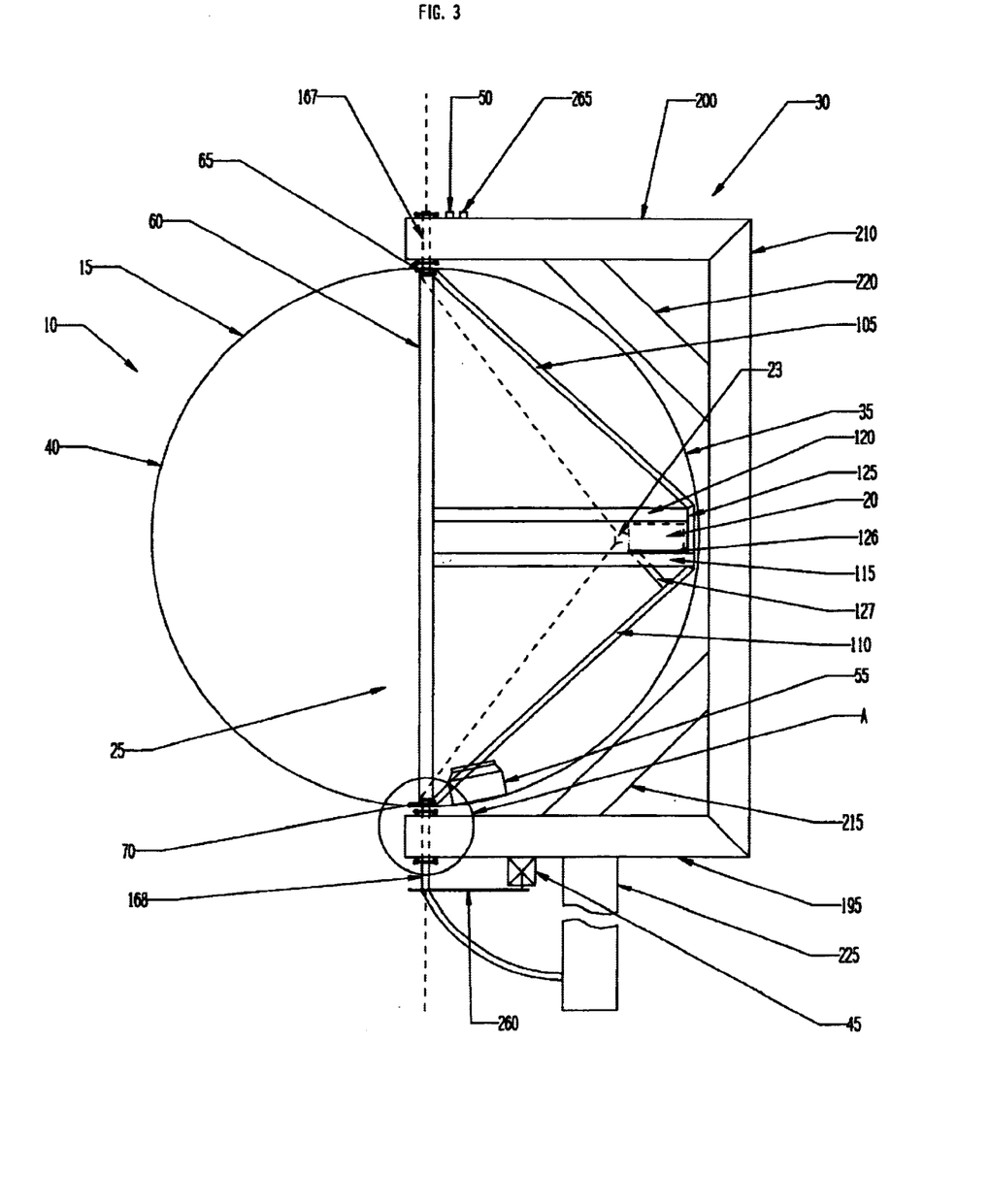
FIG. 3 is a side view of the inflatable three-dimensional display of FIG. 1.
Figure 4:
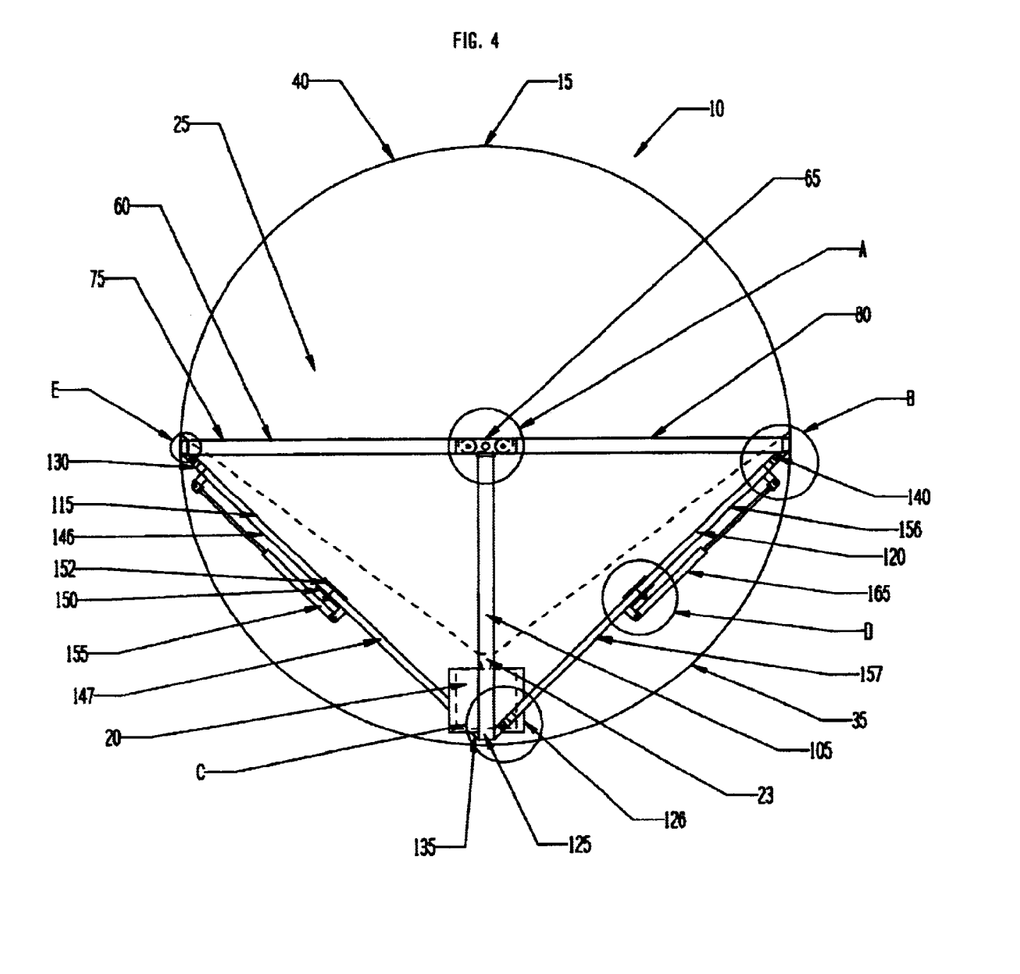
FIG. 4 is a plan view of the inflatable three-dimensional display of FIG. 1.

Reference is now made to FIGS. 2, 3 and 4, which are various views of inflatable three-dimensional display 10. Internal support structure 25 includes a curved support member assuming a closed loop configuration. In the most preferred embodiment of the invention, inflatable balloon 15 is substantially spherical and the closed loop assumes a substantially circular configuration of a ring 60. Ring 60 is mechanically connected to inflatable balloon 15 along substantially the complete circumference of ring 60 at the position where side 35 and side 40 overlap.

Reference is again made to FIG. 2. Ring 60 is configured to fold around central axis 17 by forming ring 60 from an upper hinge element 65, a lower hinge element 70 and two curved elements 75 and 80. Curved elements 75 and 80 are substantially semi-circular. Curved elements 75 and 80 are typically formed from elongated hollow metal tubes with a substantially rectangular cross-section that are bent along their direction of elongation.

Figure 5:
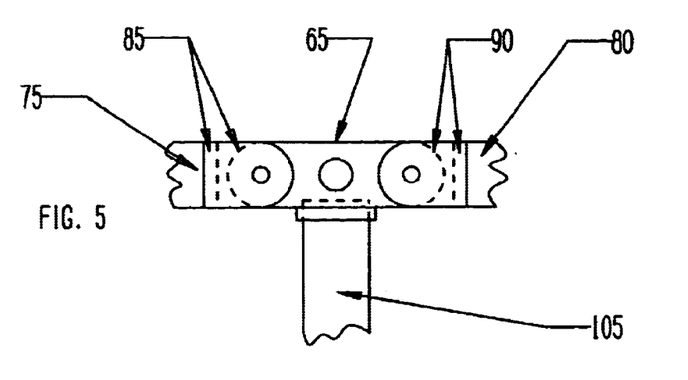
FIG. 5 is an enlarged view of the region indicated by the letter A in FIG. 4.

Reference is now made to FIG. 5, which is an enlarged view of the region indicated by the letter A in FIG. 4. Upper hinge element 65 is typically formed from a solid metal plate with a substantially rectangular cross-section with a hinge 85 at one end of the metal plate and a hinge 90 at the other end of the metal plate.

Figure 6:
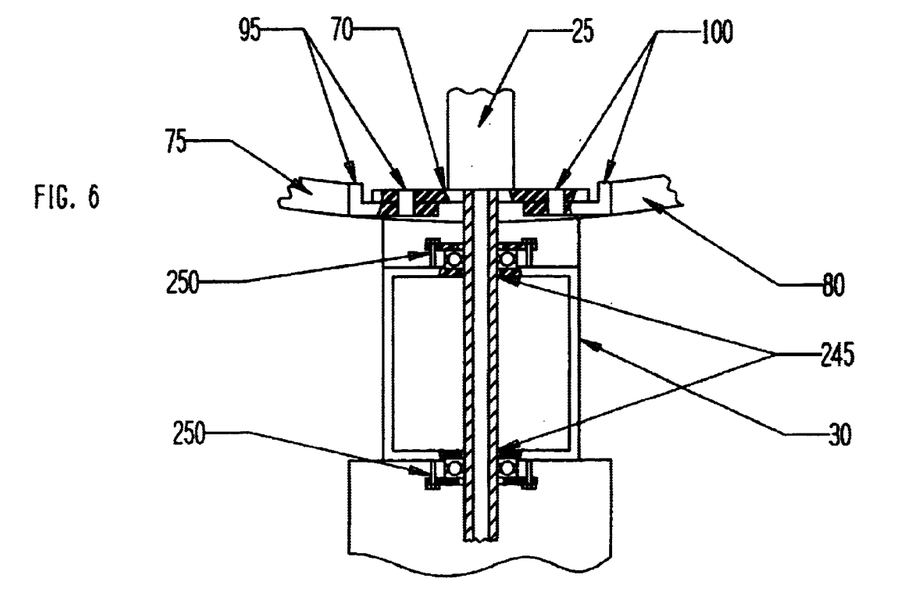
FIG. 6 is an enlarged view of the region indicated by the letter A in FIG. 2.

Reference is now made to FIG. 6, which is an enlarged view of the region indicated by the letter A in FIG. 2. Lower hinge element 70 is typically formed from a solid metal plate with a substantially rectangular cross-section with a hinge 95 at one end of the metal plate and a hinge 100 at the other end of the metal plate. It should be noted that hinges 85, 90, 95, 100 are typically of substantially the same form.

Reference is again made to FIG. 2. Curved element 75 is connected, typically by welding, to hinge 85 and hinge 95. Curved element 80 is connected, typically by welding to hinge 90 and hinge 100. Ring 60 is needed to ensure that inflatable balloon 15 is adequately supported and to prevent tearing of the fabric of inflatable balloon 15.

Reference is again made to FIGS. 1, 2, 3 and 4. Internal support structure 25 also includes four support arms 105, 110, 115 and 120 and a bracket 125 each typically being formed from elongated hollow metal tubes with a substantially rectangular cross-section. Support arms 105, 110, 115 and 120 are each connected to ring 60 and to bracket 125. Internal support structure also includes a support plate 126 and a support arm 127. Support arm 127 is typically formed from an elongated hollow metal tube with a substantially rectangular cross-section. Bracket 125 is mechanically connected to the rear of projector 20. Support arm 127 is connected to support arm 110 and to support plate 126. Support plate 126 is substantially horizontal and supports the base of projector 20. Bracket 125 is optimally disposed, with its elongated direction in a vertical position, as close to side 35 as possible and substantially at the center of side 35. The optimal positioning of bracket 125 enables the optimal positioning of projector 20 so that projection lens 23 is as far away from side 40 as possible and projection lens 23 is positioned opposing the center of side 40.

Reference is again made to FIGS. 3 and 5. One end of support arm 105 is connected to the center of upper hinge element 65, typically by welding, and the other end of support arm 105 is connected to the top of bracket 125, typically by welding.

Figure 7:
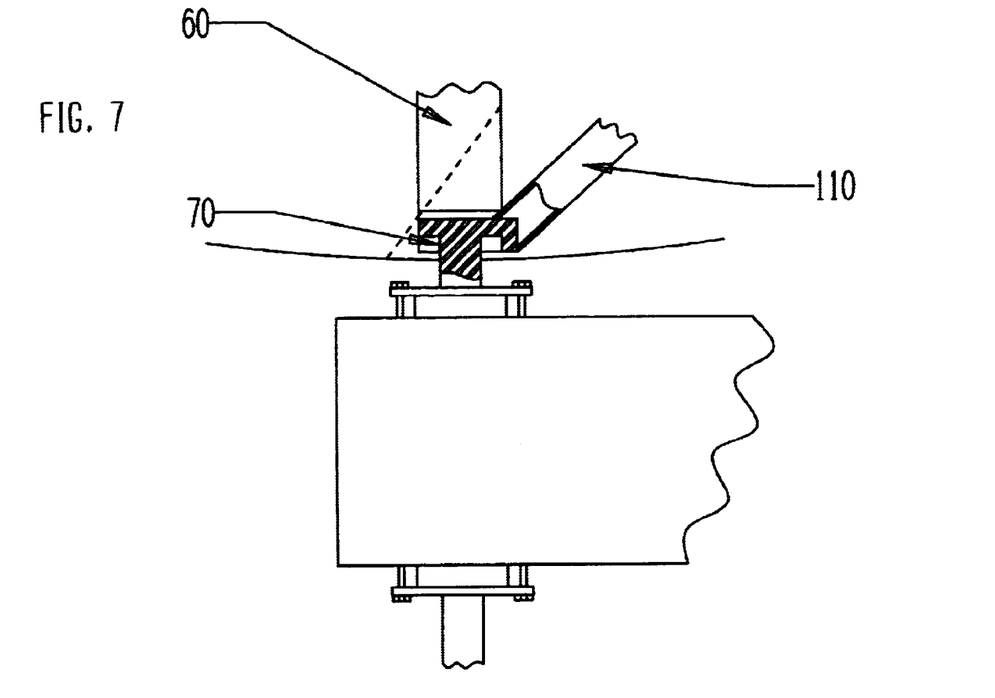
FIG. 7 is an enlarged view of the region indicated by the letter A in FIG. 3.

Reference is now made to FIG. 7, which is an enlarged view of the region indicated by the letter A in FIG. 3. Reference is also made to FIG. 3. One end of support arm 110 is connected to the center of lower hinge element 70, typically by welding; the other end of support arm 110 is connected to the bottom of bracket 125, typically by welding.

Reference is again made to FIG. 4. One end of support arm 115 is connected to curved element 75 by a hinge 130 and the other end of support arm 115 is connected to the bottom of bracket 125 by a hinge 135.

Figure 8:
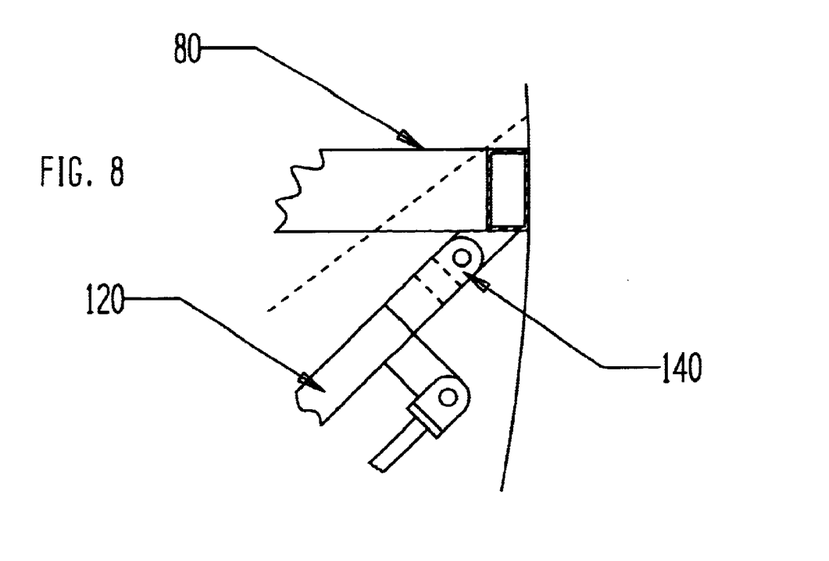
FIG. 8 is an enlarged view of the region indicated by the letter B in FIG. 4.
Figure 9:
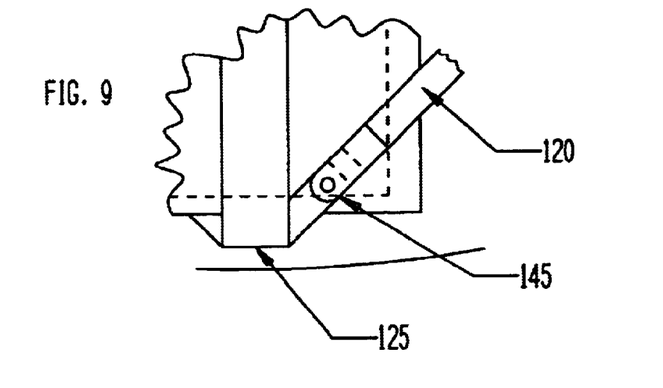
FIG. 9 is an enlarged view of the region indicated by the letter C in FIG. 4.

Reference is now made to FIGS. 8 and 9. FIG. 8 is an enlarged view of the region indicated by the letter B in FIG. 4. FIG. 9 is an enlarged view of the region indicated by the letter C in FIG. 4. Reference is also made to FIG. 4. One end of support arm 120 is connected to curved element 80 by a hinge 140 and the other end of support arm 120 is connected to the top of bracket 125 by a hinge 145.

Reference is again made to FIG. 4. Support arm 115 includes two portions 146, 147 that are connected using hinge 150. A support plate 152, which is substantially rectangular, is connected, typically by welding, to portion 146 on the side of support arm 115 that is opposite hinge 150, so that support plate 152 overlaps both portions 146 and 147. The above is to prevent support arm folding 115 folding in two directions and to further strengthen internal support structure 25. A linear actuator 155 is attached to portions 146, 147 to enable automatic folding of support arm 115. Linear actuator 155 typically contains a piston and cylinder. The piston is typically moved in and out of the cylinder by fluid pressure within the cylinder or by a solenoid or by a motor driven mechanism. Linear actuator is not limited to the above examples and can also take other forms in order to perform the same function.

Figure 10:
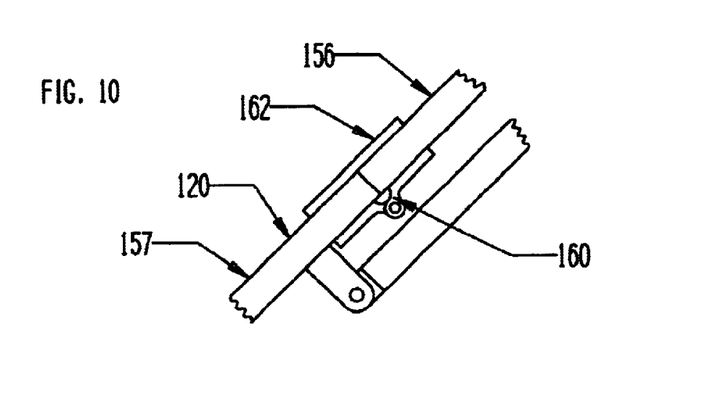
FIG. 10 is an enlarged view of the region indicated by the letter D in FIG. 4.

Reference is now made to FIG. 10, which is an enlarged view of the region indicated by the letter D in FIG. 4. Support arm 120 includes two portions 156, 157 that are connected by hinge 160. A support plate 162, which is substantially rectangular, is connected, typically by welding, to portion 156 on the side of support arm 120 that is opposite hinge 160, so that support plate 162 overlaps both portions 156 and 157. The above is to prevent support arm folding 120 folding in two directions and to further strengthen internal support structure 25.

Reference is again made to FIG. 4. A linear actuator 165 is attached to portions 156, 157 of support arm 120 to enable automatic folding of support arm 120.

Reference is again made to FIGS. 2, 3 and 4. Support arms 105, 110 substantially lie in a same plane. Support arms 105, 110 typically have a length that is considerably greater than their widths and therefore in common usage it is reasonable to say that the elongated direction of the support arms lie in a plane. Support arms 115, 120 lie in planes that are substantially parallel. The planes of support arms 115, 120 are substantially perpendicular to the plane of support arms 105, 110 as well as the plane of ring 60. The plane of ring 60 is also substantially perpendicular to the plane of support arms 105, 110. Support arm 115 is below projector 20 and support arm 120 is above projector 20, thereby enabling internal support structure 25 to fold more completely during windy conditions. It is possible that support arms 115 and 120 be in the same plane, however, in the most preferred embodiment of the invention they are in different parallel planes as described above.

Reference is again made to FIGS. 3 and 4. It should be noted that internal support structure 25, which includes ring 60, support arms 105, 110, 115, 120 and bracket 125 do not block the projection of images by projector 20 onto side 40. However, ring 60 in combination with support arms 105, 110, 115, 120 and bracket 125 ensure that projector 20 is kept steady in relation to inflatable balloon 15.

Reference is again made to FIG. 2. One end of a top rod 167 is connected, typically by welding, to the top of upper hinge element 65 so that the elongated direction of top rod 167 is substantially vertical. One end of a bottom rod 168 is connected, typically by welding, to the bottom of lower hinge element 70 so that the elongated direction of bottom rod 168 is substantially vertical. It should be noted that bottom rod 168 is hollow to enable electrical cables and communications cables to be fed into inflatable balloon 15 through bottom rod 168.

Figure 11:
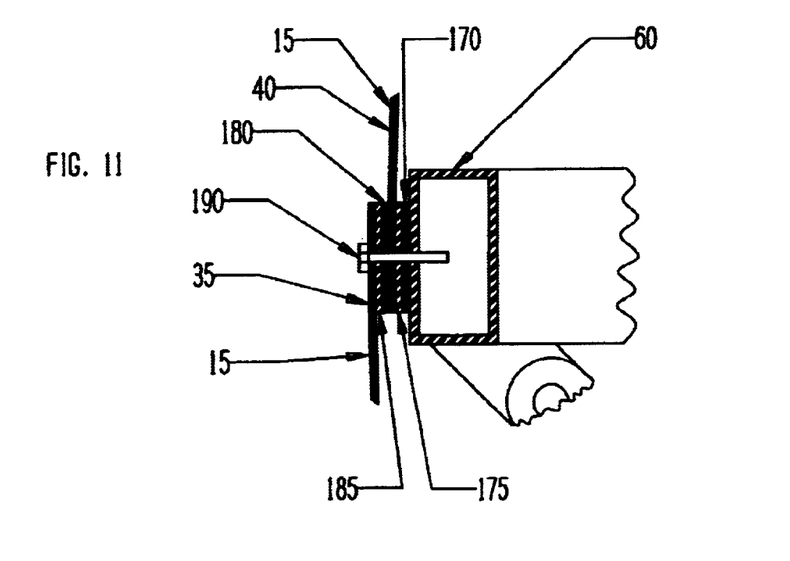
FIG. 11 is an enlarged view of the region indicated by the letter E in FIG. 4.

Reference is now made to FIG. 11, which is an enlarged view of the region indicated by the letter E in FIG. 4. As explained above, inflatable balloon 15 is formed from two substantially equal sides 35 and 40. Sides 35, 40 are typically formed from smaller sections that are joined together. The material used for sides 35, 40 should be waterproof and sun resistant to prevent water damage to inflatable balloon 15. As mentioned above with reference to FIG. 1, side 40 is also made of a material that is suitable for rear projection. PVC fabric with ultraviolet protection is typically used as it provides waterproofing, sun resistance, it can be welded together and it can be printed on. Sides 35, 40 are attached to ring 60 using an attachment configuration providing a strong, water-resistant and flexible method for repeated attachment and detachment. This is typically achieved by Velcro. Side 40 is attached to ring 60. Side 35 is attached to side 40. The overlap of side 35 and side 40 is typically 5 cm. A strip of Velcro loops 170 is connected, typically by adhesive and rivets, to substantially the entire outer circumference of ring 60. A strip of Velcro hooks 175 is connected, typically by adhesive, welding or sewing, to substantially the entire inner edge of side 40. A strip of Velcro loops 180 is connected to substantially the entire outer edge of side 40. A strip of Velcro hooks 185 is connected to substantially the entire inner edge of side 35. Inflatable balloon is attached to ring 60 by fastening strip of Velcro loops 170 to strip of Velcro hooks 175 and strip of Velcro loops 180 to strip of Velcro hooks 185. Sides 35, 40 each have a zip (not shown) starting from the bottom of their side to ease attachment and detachment of inflatable balloon 15. Side 35 also has a zip (not shown) close to projector 20 (FIG. 3) to enable easy access to projector 20. Sides 35 and 40 are secured to ring 60 in a plurality of locations thereon, with a bolt 190. Bolt 190 goes through strips of Velcro 170, 175, 180, 185 and sides 35, 40.

Reference is again made to FIG. 3. External support structure 30 ensures that inflatable balloon 15 is held steady. External support structure 30 typically includes two horizontal beams, a lower beam 195 below inflatable balloon 15 and an upper beam 200 above inflatable balloon 15. Lower beam 195 and upper beam 200 are mechanically connected by a vertical beam 210. A diagonal support beam 215 mechanically connects lower beam 195 and vertical beam 210. A diagonal support beam 220 mechanically connects upper beam 200 and vertical beam 210. Lower beam 195 is mechanically connected to a mast 225. Mast 225 is sunk into a substrate (not shown). Beams 195, 200, 210, 215, 220 are typically elongated hollow metal tubes with a substantially rectangular cross-section.

Reference is again made to FIG. 2. External support structure 30 is rotatably connected to internal support structure 25 substantially on central axis 17 at the top 230 and bottom 235 of inflatable balloon 15. This is achieved by making two holes 240, one in the topside of upper beam 200 and one in the bottom side of upper beam 200, both holes being in vertical alignment with each other. Top rod 167 is disposed in upper beam 200 through holes 240. Two holes 245 are made in lower beam 195, one in the topside of lower beam 195 and one in the bottom side of lower beam 195, both holes being in vertical alignment with each other. Bottom rod 168 is disposed in lower beam 195 through holes 245. Therefore, internal support structure 25 can rotate in relation to external support structure 30.

Reference is again made to FIG. 2 and FIG. 6. A ball bearing 250 is placed at each hole 240 (FIG. 2) and 245 (FIG. 6) to ease twisting of internal support structure 25 within external support structure 30.

Reference is again made to FIG. 3. Bottom rod 168 extends below lower beam 195 to enable connection to motor 45. Motor 45 is disposed on the bottom side of lower beam 195. Bottom rod 168 and motor 45 are connected, typically by a non-slip belt 260 or a gear configuration (not shown). Light sensor 50 is disposed, typically, on the topside of upper beam 200. The mechanical connection between motor 45 and bottom rod 168 is configured to allow manual turning of inflatable balloon 15, for example: when repair work is necessary or when the non-projected image on side 35 needs to be changed. External support structure 30 also includes a work platform (not shown) to enable repair workers to make repairs and change the non-projected image (not shown).

Figure 12:
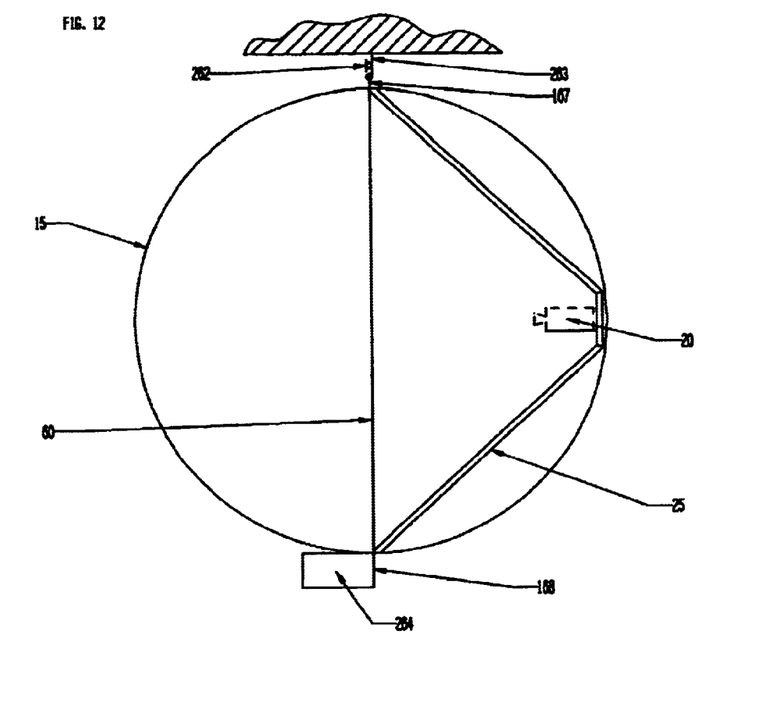
FIG. 12 is a schematic side view of the inflatable balloon of FIG. 1 being suspended.

Reference is now made to FIG. 12, which is a schematic side view of inflatable balloon 15 being suspended. This can be achieved by mechanically connecting top rod 167 to a hook 262. Hook 262 can then be used to suspend inflatable balloon 15 from above using another hook 263. In such a case, external support structure 30 includes hook 262 and 263. A counterweight 264 is deployed to counter the turning moment caused by the weight of the internal support structure 25 and the projector 20. Counterweight 264 is typically deployed so that its center of gravity is on the side of ring 60 opposite to projector 20 and the majority of internal support structure 25. Counterweight 264 is typically connected to at least one of top rod 167 and bottom rod 168.

Figure 13:
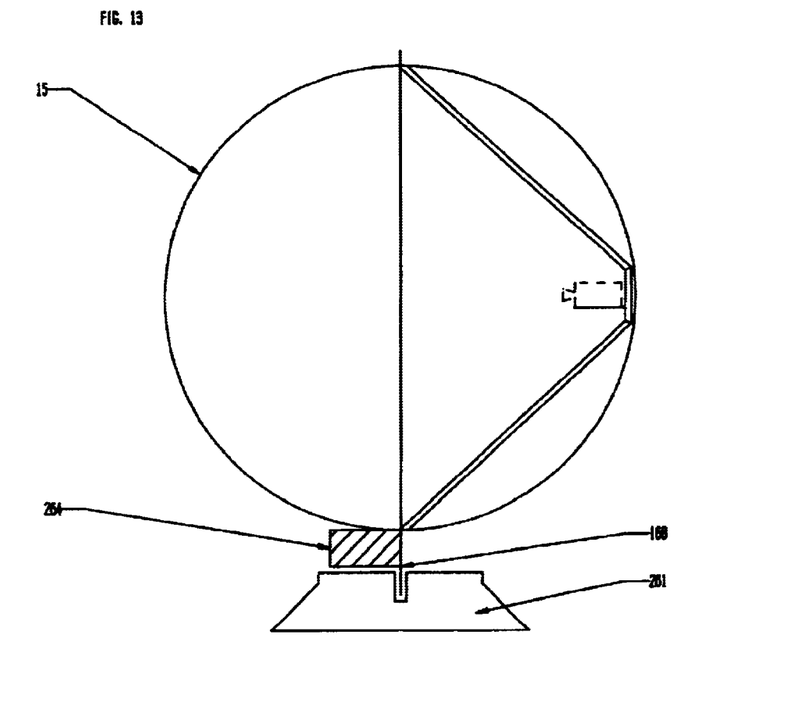
FIG. 13 is a schematic side view of the inflatable balloon of FIG. 1 being supported from below.

Reference is now made to FIG. 13, which is a schematic side view of inflatable balloon 15 being supported from below. This is achieved by connecting bottom rod 168 to a base 261 on the ground or on a vehicle, or on top of a telescopic pole and using counterweight 264. The counter weight is typically connected to bottom rod 168.

Figure 14:
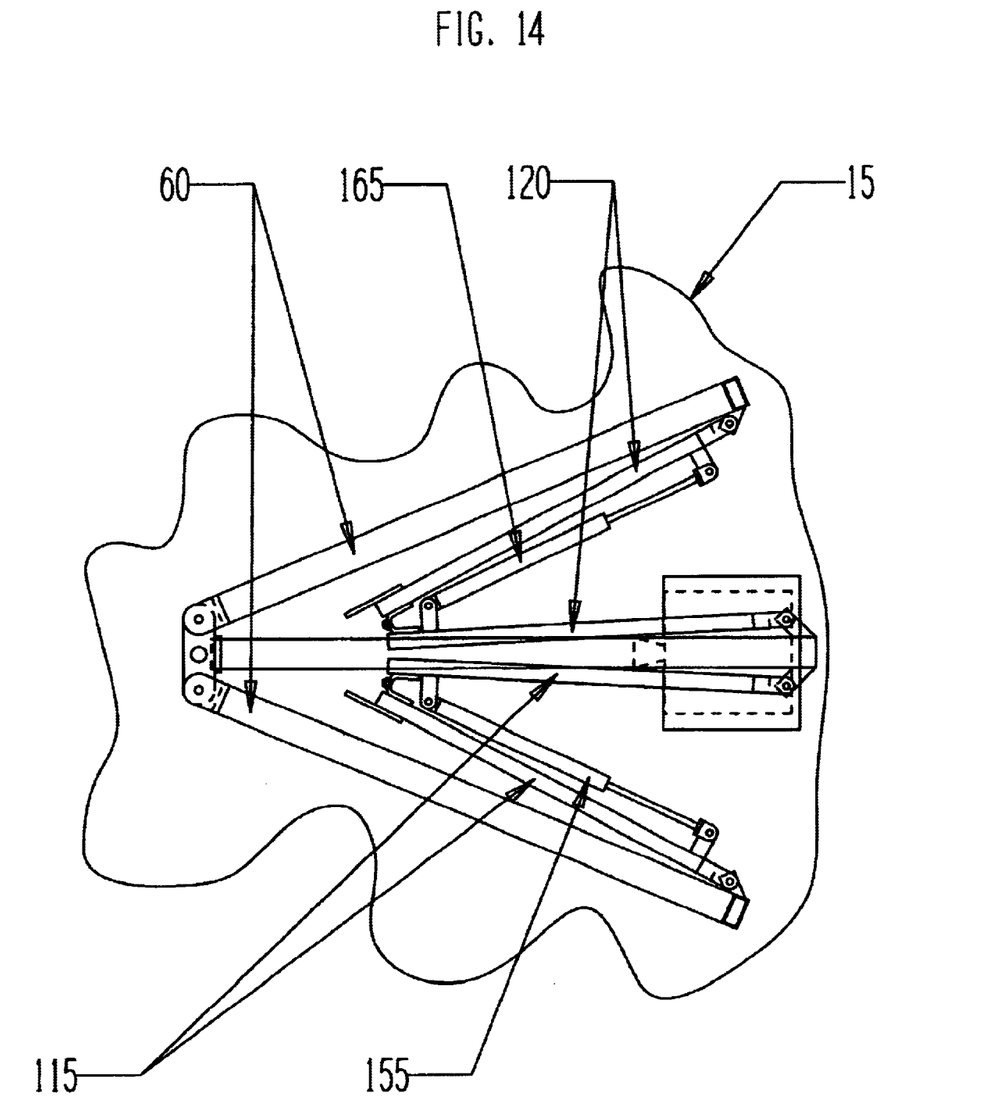
FIG. 14 is a plan view of the inflatable three-dimensional display of FIG. 1 in its collapsed state.
Figure 15:
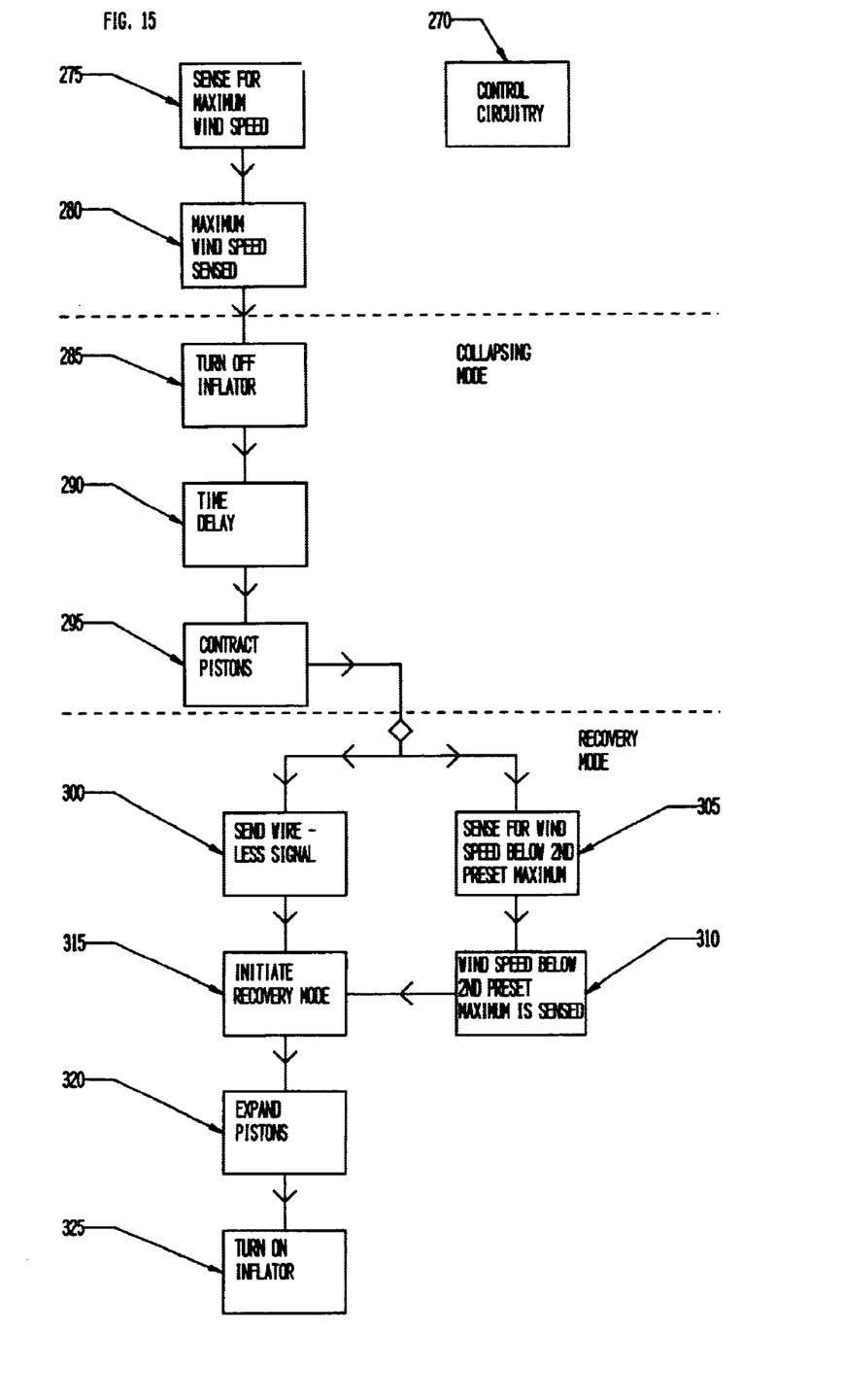
FIG. 15 is a schematic representation of the operation of a system for controlling an inflatable display according to wind conditions that is operable in accordance with a preferred embodiment of the invention.

Reference is now made to FIGS. 3, 14 and 15. FIG. 14 is a plan view of the inflatable three-dimensional display of FIG. 1 in its collapsed state. FIG. 15 is a schematic representation of the operation of a system for controlling an inflatable display according to wind conditions that is operable in accordance with a preferred embodiment of the invention. A wind gauge 265 is disposed, typically, on the topside of upper beam 200 and the output of wind gauge 265 is sent to a control circuitry 270 (not shown). In block 275, control circuitry 270 senses for a preset maximum wind speed. During this time period, inflator 55 is activated, thereby maintaining the inflation of inflatable balloon 15. In block 280, the preset maximum wind speed is sensed by control circuitry 270. Control circuitry then initiates a collapsing mode. In block 285, collapsing mode commences by control circuitry 270 turning off inflator 55. In block 290, control circuitry 270 initiates a short time delay, typically 30 to 60 seconds. In block 295, control circuitry 270 initiates the contraction of linear actuators 155, 165 thereby causing support arms 115, 120 to fold, which in turn cause ring 60 to fold. The folding of ring 60 causes inflatable balloon 15 to fold, thereby protecting inflatable balloon 15 from damaging wind conditions. In block 300, a recovery mode for reestablishing inflatable balloon 15 can be initiated by remotely transmitting a signal, for example: by mobile telephone or by infrared to a sensor that is connected to control circuitry 270. Alternatively, in block 305, the recovery mode can be initiated automatically control circuitry 270 sensing for a wind speed below a second preset maximum. In block 310, a wind speed below a second preset maximum is sensed by control circuitry 270. In block 315, control circuitry 270 initiates the recovery mode. In block 320, control circuitry 270 initiates the recovery mode by expanding linear actuators 155, 165 thereby causing support arms 115 and 120 to unfold, which in turn cause ring 60 to unfold. The unfolding of ring 60 causes inflatable balloon 15 to unfold. In block 325, control circuitry 270 turns on inflator 55.

Internal support structure 25 is typically configured to manually fold and unfold by manually overriding control circuitry 270 and manually turning off and on inflator 55 and by manually operating linear actuators 155, 165 or by other mechanical means.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:
1. An inflatable display comprising:
(a) an inflatable balloon, said inflatable balloon being substantially spherical, said inflatable having a first side and a second side;
(b) a projector having a projection lens, said projection lens is deployed within said first side to project onto said second side;
(c) an internal support structure including a closed loop having a maximum linear dimension which is at least 90% of a maximum linear dimension of said inflatable balloon, said internal support structure being configured for supporting:
(i) said inflatable balloon; and
(ii) said projector so that said projection lens is eccentrically disposed within said inflatable balloon, such that said projection lens is configured to project through said closed loop onto at least 35% of said inflatable balloon; and
(d) an external support structure that supports said internal support structure.

2. The inflatable display of claim 1 wherein said inflatable balloon has a central axis and said projection lens is deployed within said inflatable balloon eccentric to said central axis.

3. The inflatable display of claim 2 wherein said external support structure is mechanically connected to said internal support structure substantially on said central axis.

4. The inflatable display of claim 1 wherein said internal support structure can rotate in relation to said external support structure.

5. The inflatable display of claim 1 wherein said internal support structure includes a support arm that is mechanically connected to both said closed loop and said projector.

6. The inflatable display of claim 5 wherein said closed loop assumes the configuration of a ring.

7. The inflatable display of claim 5 wherein: said closed loop is configured to fold; and said internal support structure further includes a folding mechanism.

8. The inflatable display of claim 7 wherein said folding mechanism includes a linear actuator.

9. The inflatable display of claim 7 further comprising:
(a) a wind gauge; and
(b) a control circuitry that is configured to control said folding mechanism in response to an output of said wind gauge.

10. The inflatable display of claim 7 wherein:
(a) said support arm includes a first support arm, a second support arm, a third support arm;
(b) said second support arm includes a first portion and a second portion that are connected by a first hinge; and
(c) said third support arm includes a third portion and a fourth portion that are connected by a second hinge.

11. The inflatable display of claim 10 wherein said support arm includes a fourth support arm.

12. The inflatable display of claim 11 wherein:
(a) said first support arm and said fourth support arm substantially lie in a first plane; and
(b) said second support arm lies in a second plane and said third support arm lies in a third plane, wherein said second plane is substantially parallel to said third plane and said second plane is substantially perpendicular to said first plane.

13. The inflatable display of claim 10 wherein said projector is disposed between said second plane and said third plane.

14. The inflatable display of claim 10 wherein said folding mechanism includes: a first linear actuator that is mechanically connected to said first portion and said second portion; and a second linear actuator that is mechanically connected to said third portion and said fourth portion.

15. The inflatable display of claim 1 wherein:
said inflatable balloon has an attachment configuration for attaching and detaching repeatably at least one of said first section and said second section to said closed loop.

16. The inflatable display of claim 1 further comprising an inflator deployed to pump air from outside of said inflatable balloon to inside said inflatable balloon.

17. The inflatable display of claim 1 further comprising a counterweight that is deployed to counter a turning moment caused by said internal support structure and said projector.

18. The inflatable display of claim 1 further comprising a non-projected image and wherein said inflatable balloon has an outer surface and thereon disposed is said non-projected image.

19. The inflatable display of claim 18 further comprising:
(a) a light sensor;
(b) a motor configured to rotate said inflatable balloon; and
(c) a control system that is configured to control said motor in response to an output of said light sensor in order to turn said non-projected image towards a viewing direction by day and to turn said non-projected image away from a viewing direction by night.

20. A method to control an inflatable display according to wind conditions, the inflatable display comprising an inflatable balloon and a projector disposed inside the balloon, the method comprising the steps of:
(a) operating in a sensing mode by:
(i) sensing for a preset maximum wind speed; and
(ii) maintaining inflation of the inflatable display;
(b) operating in a collapsing mode by:
(i) reducing inflation of the inflatable display; and
(ii) folding an internal support structure that is mechanically connected to the inflatable display; and
(c) operating in a recovery mode by:
(i) unfolding said internal support structure; and
(ii) increasing inflation of the inflatable display.

21. The method of claim 20 wherein said step of folding is performed by folding said internal support structure that is mechanically connected to the inflatable display by activating at least one linear actuator that is mechanically connected to said internal support structure.

22. The method of claim 20 further comprising, prior to said step of unfolding a step of sensing for a wind speed below a second preset maximum.

23. The method of claim 20 further comprising, prior to said step of unfolding, remotely transmitting a signal to initiate said recovery mode.

24. The method of claim 20 wherein the inflatable display is substantially spherical.

* * * * *